US008897763B2

(12) United States Patent
Murakami et al.

(10) Patent No.: US 8,897,763 B2

(45) Date of Patent: Nov. 25, 2014

(54) SYSTEM AND METHOD FOR PROVIDING CONFIGURATIONS OF LOCAL NETWORK

(75) Inventors: Shingo Murakami, Kanagawa (JP); Ayodele Damola, Solna (SE); Johan Hjelm, Tokyo (JP); Ryohi Kato, Kangawa (JP); Takeshi Matsumura, Kawasaki (JP); Tashikane Oda, Tokyo (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 113 days.

(21) Appl. No.: 13/521,161

(22) PCT Filed: Jan. 13, 2010

(86) PCT No.: PCT/JP2010/050578

§ 371 (c)(1), (2), (4) Date: Sep. 10, 2012

(87) PCT Pub. No.: WO2011/086706

PCT Pub. Date: Jul. 21, 2011

(65) Prior Publication Data

US 2013/0023257 A1 Jan. 24, 2013

(51) Int. Cl.

*H04W 8/18* (2009.01)
*H04W 8/20* (2009.01)
*H04W 8/24* (2009.01)

(52) U.S. Cl.

CPC .. *H04W 8/20* (2013.01); *H04W 8/24* (2013.01)
USPC .......................................... 455/418; 455/456.1

(58) Field of Classification Search

USPC ........ 455/414.1, 418–420; 370/242, 252, 331
See application file for complete search history.

(56) References Cited

FOREIGN PATENT DOCUMENTS

| | | | |
|---|---|---|---|
| JP | 2003/235082 | A | 8/2003 |
| JP | 2006/203306 | A | 8/2006 |
| JP | 2008/131429 | A | 6/2008 |
| JP | 2009-182564 | A | 8/2009 |
| JP | 2009/303188 | A | 12/2009 |
| WO | 2006/062034 | A1 | 6/2006 |

*Primary Examiner* — Sam Bhattacharya

(74) *Attorney, Agent, or Firm* — Murphy, Bilak & Homiller, PLLC

(57) ABSTRACT

A system for providing a user terminal with configurations of a local network is provided. The system includes an obtaining unit configured to obtain the configurations of the local network and a telephone number corresponding to the local network, a storage unit configured to store the obtained configurations and the obtained telephone number such that the obtained configurations and the obtained telephone number are associated with each other, a receiving unit configured to receive a request for the configurations from the user terminal, the request comprising the telephone number corresponding to the local network, a retrieving unit configured to retrieve the configurations associated with the received telephone number from the storage unit, and a response unit configured to respond the retrieved configurations to the user terminal.

9 Claims, 10 Drawing Sheets

SYSTEM AND METHOD FOR PROVIDING CONFIGURATIONS OF LOCAL NETWORK

TECHNICAL FIELD

The present invention relates to a system and method for providing a user terminal with configurations of a local network.

BACKGROUND

Every mobile phone in the future will have local network interfaces such as WiFi, NFC, Bluetooth, Zigbee in addition to cellular interfaces. Through the local interfaces, users using their mobile phone are able to reach local services in home network, car network, hotspot, hotel rooms, shops etc. In order to enjoy these local services, users need to setup local specific configurations that are mainly concerning configurations of local interfaces. However, it is still a difficult task for IT-unfamiliar people to configure a device to use a network. Even for IT-familiar people, it's still cumbersome because for example WiFi security configuration involves several steps of clicking buttons and entering a password for generating a WEP/WPA key and the situation gets worse even for technicians if they forget a password for the WEP key. This problem occurs because those local interfaces, unlike cellular interface, are not provisioned with initial configurations when a mobile phone is started; therefore a user is always required to input local configurations in his mobile phone to adapt to the local setup. In this way, a user is confronted with an excessive set of configuration parameters to be manually input. This may lead to the user not attempting the usage at all, or failing in it. In other words, the user may give up when the user has to type in all the letters and numbers in the different hard-to-reach places required to configure.

US20060178131 proposes a system in which a mobile phone searches an SSID in the vicinity and sends the found SSID to an application server. The application server queries a corresponding access point to get a WEP key, which is finally sent to the requesting mobile phone. EP2044785A2 proposes an automatic registration and configuration system for an in-building cellular base station. JP2005286782 proposes a system in which configuration parameters such as SSID and WEP keys are generated at the application server and the configuration parameters are sent to both the AP device and the terminal.

However, the SSID would be still unfamiliar and hesitate to use the SSID especially for the IT-unfamiliar people. Therefore, it is desired to provide a technique for providing configurations of a local network more easily.

SUMMARY

According to an aspect of the invention, a system for providing a user terminal with configurations of a local network is provided. The system includes: an obtaining unit configured to obtain the configurations of the local network and a telephone number corresponding to the local network; a storage unit configured to store the obtained configurations and the obtained telephone number such that the obtained configurations and the obtained telephone number are associated with each other; a receiving unit configured to receive a request for the configurations from the user terminal, the request comprising the telephone number corresponding to the local network; a retrieving unit configured to retrieve the configurations associated with the received telephone number from the storage unit; and a response unit configured to respond the retrieved configurations to the user terminal.

According to another aspect of the invention, a user terminal is provided. The user terminal includes: a mobile network interface configured to communicate with a mobile network; a local network interface configured to communicate with a local network; and a user interface configured to receive, from a user of the user terminal, a telephone number corresponding to the local network. The mobile network interface is further configured to send the request to the mobile network using the received telephone number, and configured to receive the configurations of the local network from the mobile network. The local network interface is further configured to use the received configurations to communicate the local network.

Further features of the present invention will become apparent from the following description of exemplary embodiments with reference to the attached drawings.

DETAILED DESCRIPTION

Embodiments of the present invention will now be described with reference to the attached drawings. Each embodiment described below will be helpful in understanding a variety of concepts from the generic to the more specific. It should be noted that the technical scope of the present invention is defined by claims, and is not limited by each embodiment described below. In addition, not all combinations of the features described in the embodiments are always indispensable for the present invention.

Figure 1:
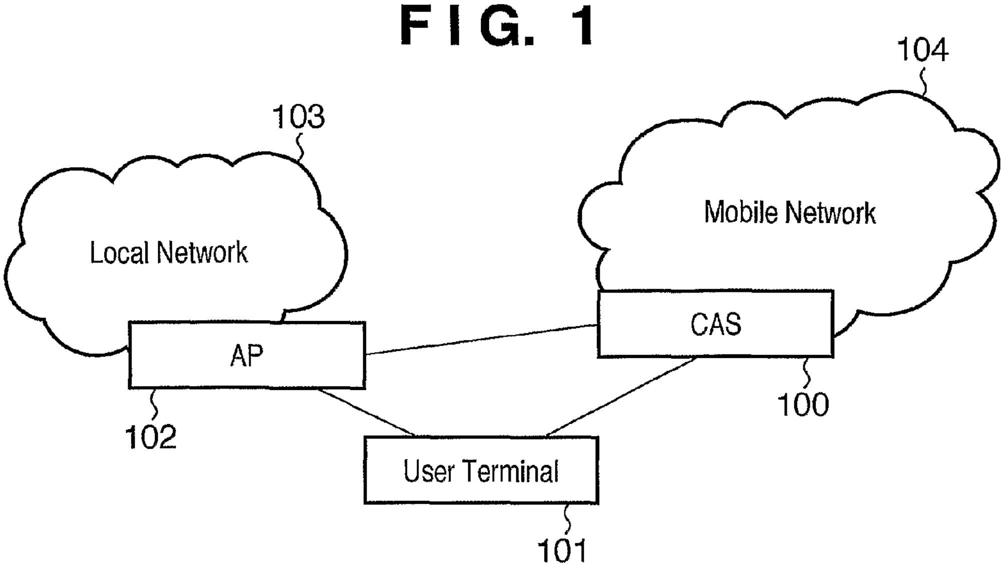
FIG. 1 illustrates an exemplary environment according to one embodiment of the present invention.

FIG. 1 illustrates an exemplary environment according to one embodiment of the present invention. The environment includes a Configuration Application Server (CAS) 100, a user terminal 101, an access point (AP) 102, a local network 103, and a mobile network 104.

The CAS 100 provides automatic configuration service in which the CAS 100 provides the user terminal 101 with configurations of the local network 103 automatically in response to a request from the user terminal 101. The CAS 100 is included in a mobile network 104 and receives a request for the configurations of the local network 103 from the user terminal 101. The request includes a telephone number corresponding to the local network 103.

The user terminal 101 is a device used by a user in order to communicate with the mobile network 104. In this embodiment, any devices that can send a request including a telephone number to the CAS 100 can be used as the user terminal 101. For example, the user terminal 101 is a mobile phone, a PDA, a mobile broadband personal computer. In one example, the user terminal 101 sends the request to the CAS 100 by dialing the telephone number corresponding to the local network 103, and other examples will be described later. The user terminal 101 can also connect to the local network 103. The user terminal 101 uses the configurations provided by the CAS 100 in order to connect to the local network 103. The configurations include, for example, parameters such as an SSID/WEP for a WiFi network and a Bluetooth device name with a PIN code for a Bluetooth network, and an access class for the local network 103.

The AP 102 is a device that manages the local network 103. The local network 103 is, for example, a WiFi network, an NFC (Near Field Communications) network, a Zigbee network, IrDA, or a Bluetooth. The local network 103 may be a home network, a hotspot network, a car network, or a hotel room network. The local network 103 has a corresponding telephone number. When the local network 103 has a plurality of sets of configurations, the local network may have a plurality of telephone numbers so that each set of configurations has a corresponding telephone number. The telephone number may be displayed with advertisements when the local network 103 is a hotspot network.

Figure 2:
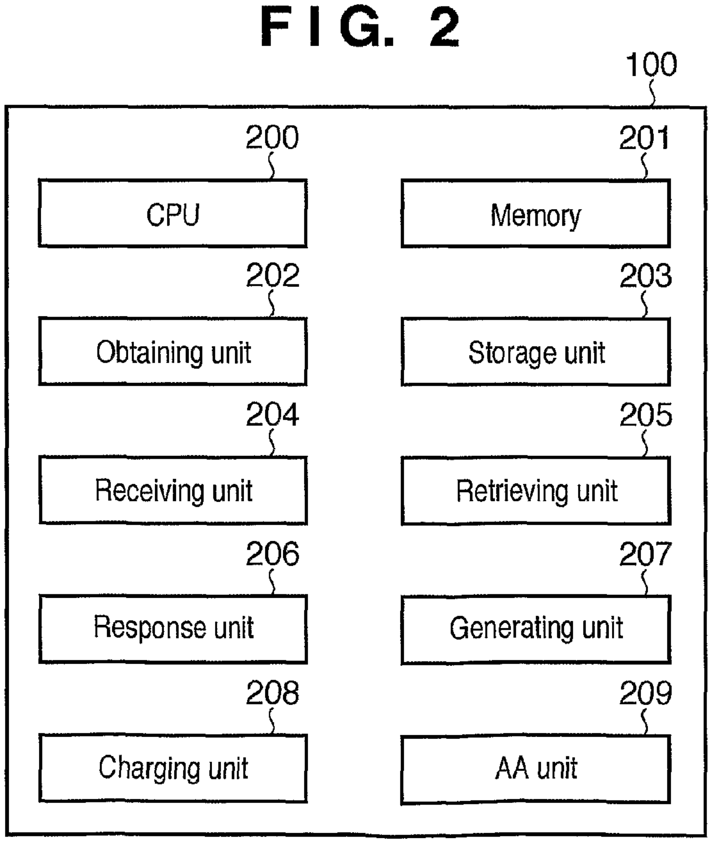
FIG. 2 illustrates an exemplary block diagram of the CAS 100 according to one embodiment.

FIG. 2 illustrates an exemplary block diagram of the CAS 100 according to one embodiment. The CAS 100 comprises a CPU 200, a memory 201, an obtaining unit 202, a storage unit 203, a receiving unit 204, a retrieving unit 205, a response unit 206, a generating unit 207, a charging unit 208, and authenticating and authorizing (AA) unit 209. The CPU 200 controls overall operations of the CAS 100. The memory 201 stores computer programs and data used for operations of the CAS 100.

The obtaining unit 202 obtains a telephone number corresponding to the local network 103 and configurations of this local network 103. The storage unit 203 stores the telephone number and the configurations such that the telephone number and the configurations are associated with each other. The storage unit 203 is implemented by, for example, an HDD, a RAM, or the like. The receiving unit 204 receives a request for the configurations of the local network 103 from the user terminal 101. The retrieving unit 205 retrieves the configurations associated with the telephone number in the request from the storage unit 203. The response unit 206 responds the retrieved configurations to the requesting user terminal 101. The generating unit 207 generates a new telephone number for the local network 103. The charging unit 208 charges the user using the automatic configuration service. The AA unit 209 authenticates and authorizes the user of the user terminal 101. In FIG. 2, all units are includes in the CAS 100. However, each unit may be included in separate devices comprised in a system.

Figure 3:
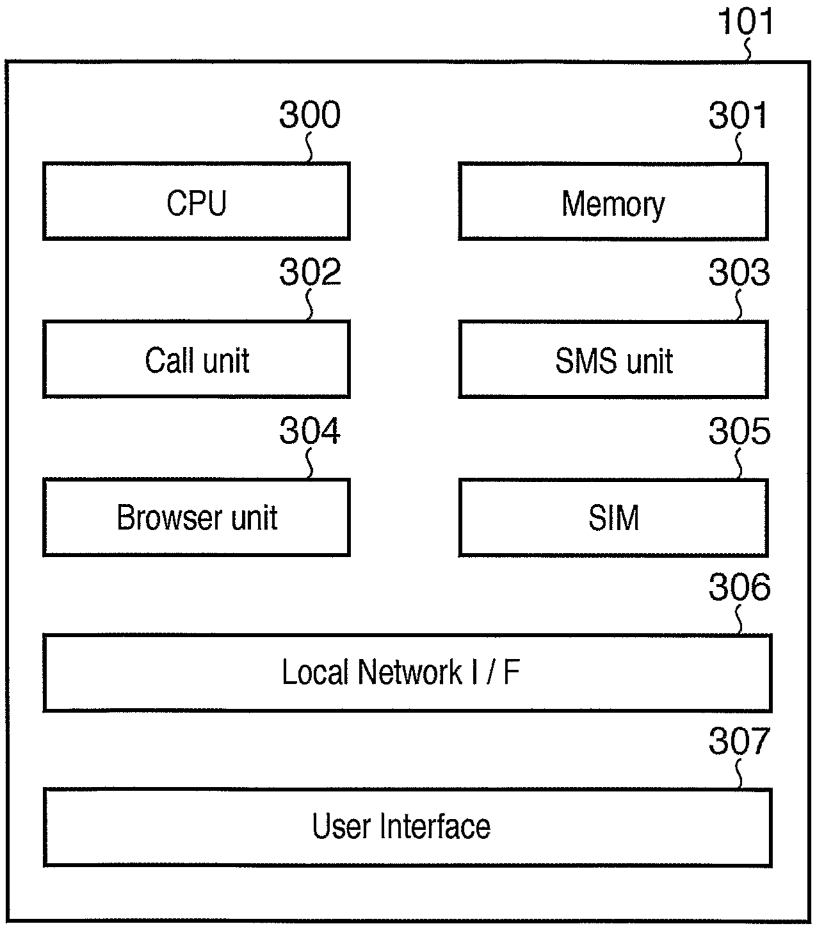
FIG. 3 illustrates an exemplary block diagram of the user terminal 101 according to one embodiment.

FIG. 3 illustrates an exemplary block diagram of the user terminal 101 according to one embodiment. The user terminal 101 comprises a CPU 300, a memory 301, a call unit 302, an SMS unit 303, a browser unit 304, a SIM 305, a local network interface (I/F) 306, and a user interface 307. The CPU 300 controls overall operations of the user terminal 101. The memory 301 stores computer programs and data used for operations of the user terminal 101.

The call unit 302 provides a call function. The user of the user terminal 101 calls to a certain telephone number using the call unit 302. The SMS unit 303 provides an SMS function. The user sends an SMS mail using the SMS unit 303. The browser unit 304 provides a browser function. The user accesses a web page using the browser unit 304. The SIM stores, for example, a telephone number of the user terminal 101. The local network interface 306 is used to connect to the local network 103. The user interface 307 is used to input/output information from/to the user of the user terminal 101. The user interface 307 is implemented by, for example, a keypad, a display, a keyboard, and/or a touch screen.

Figure 4:
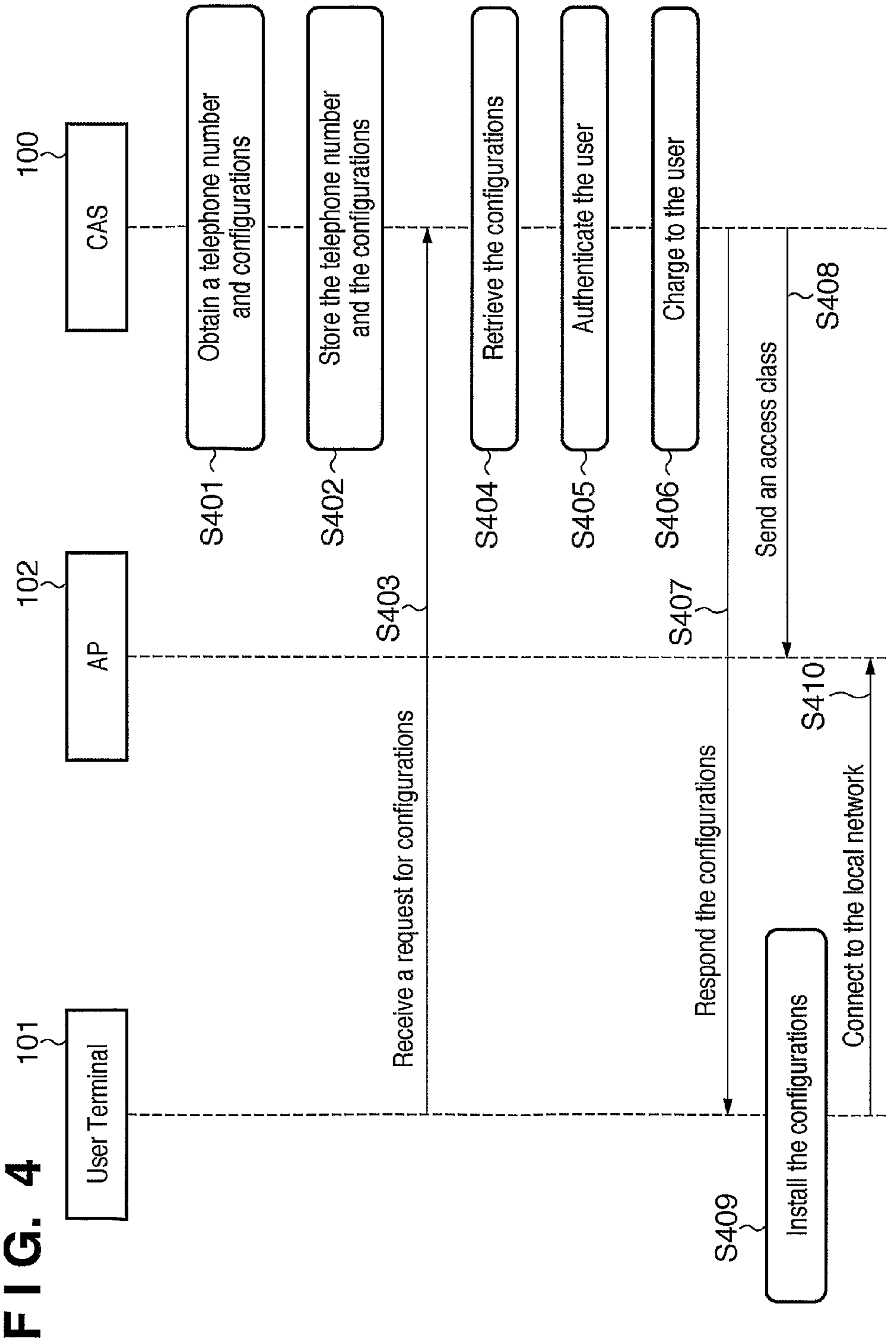
FIG. 4 illustrates an example of overall operations of the CAS 100, the user terminal 101, and the AP 102 according to one embodiment.

FIG. 4 illustrates an example of overall operations of the CAS 100, the user terminal 101, and the AP 102 according to one embodiment. The CPU included in each device executes computer programs stored in memory of each device to process these operations.

In step S401, the obtaining unit 202 obtains the telephone number corresponding to the local network 103 and the configurations of this local network 103. The obtaining unit 202 may obtain the configurations from the AP 102, or may receive an input of the configurations from an owner of the AP 102. The obtaining unit 202 may obtain, from the AP 102, the telephone number assigned for the AP 102, or may obtain, from the generating unit 207, the telephone number newly generated for the local network 103. Some examples of this step will be described in detail later.

In step S402, the storage unit 203 stores the obtained configurations and the obtained telephone number such that the obtained configurations and the obtained telephone number are associated with each other. The storage unit 203 may store a pair of the configurations and the telephone number in a table or in a database.

In step S403, the user terminal 101 sends a request for the configurations of the local network 103 to the CAS 100 and the receiving unit 204 receives the request from the user terminal 101. This request includes the telephone number corresponding to the local network 103. Some examples of this step will be described in detail later. In step S404, the retrieving unit 205 retrieves, from the storage unit 203, the configurations associated with the telephone number included in the request from the user terminal 101. In step S405, the AA unit 209 may authenticate and authorize the user of the user terminal 101. In step S406, the charging unit 208 may charge to the user of the user terminal 101 when, for example, the local network 103 is a public hotspot. When an IMS operator operates the CAS 100, the IMS operator may charge the user of the user terminal 101 through an IMS subscription of the user. This will be a new business opportunity for the IMS operator.

In step S407, the response unit 206 responds the retrieved configurations to the user terminal 101. When the AA unit 209 successfully authenticates and authorizes the user of the user terminal 101, the response unit 206 responds the configurations. In step S408, the response unit 206 may send an access class included in the configurations to the AP 102. The local network interface 306 installs the configurations in step S409 and starts connecting to the local network 103 in step S410.

Figure 5:
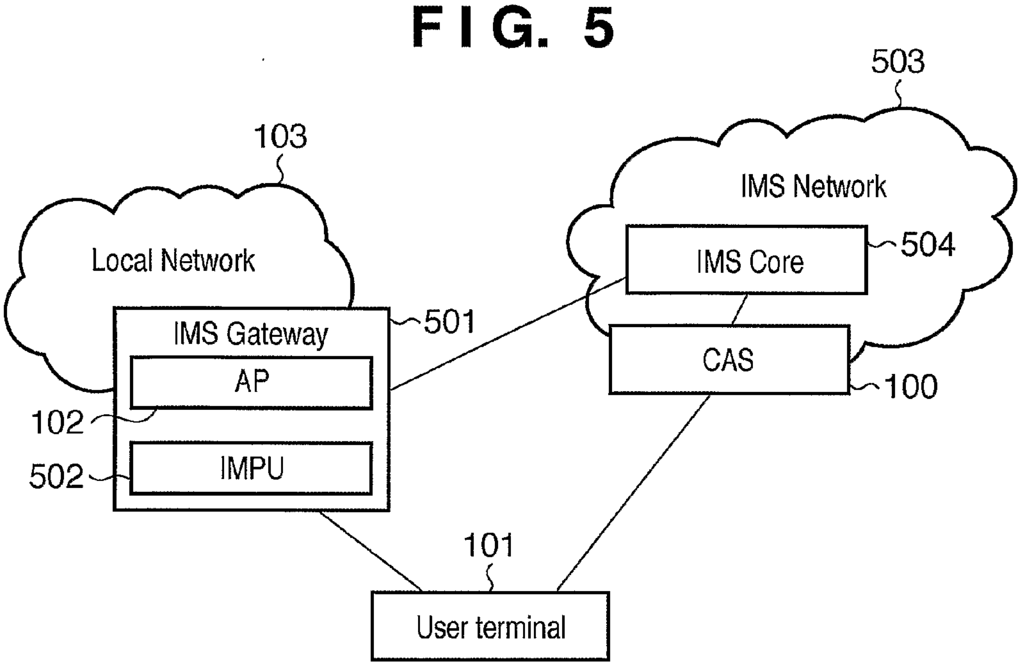
FIG. 5 illustrates an exemplary environment where IMS SIP protocols can be used.

FIG. 5 illustrates an exemplary environment where IMS SIP protocols can be used. In this environment, the mobile network 104 is an IMS network 503 and the local network 103 includes an IMS gateway 501. The IMS gateway 501 is an application layer gateway device between the IMS network 503 and the local network 103. Messages between the local network 103 and the IMS network 503 are intermediated by the IMS gateway 501 and secured by security mechanisms provided by the IMS core 504 in the IMS network 503. An IMPU (IMS public user identity) 502 is assigned for the IMS gateway 501. In FIG. 5, the IMS gateway 501 includes functionalities of the AP 102. However, the AP 102 may be a standalone device other than the IMS gateway 501 as long as the IMS gateway 501 can fetch configurations from the AP 102. In each case, the IMS gateway 501 is regarded as acting as the AP 102. The IMS core 504 may provide the charging unit 208 and the AA unit 209.

Figure 6:
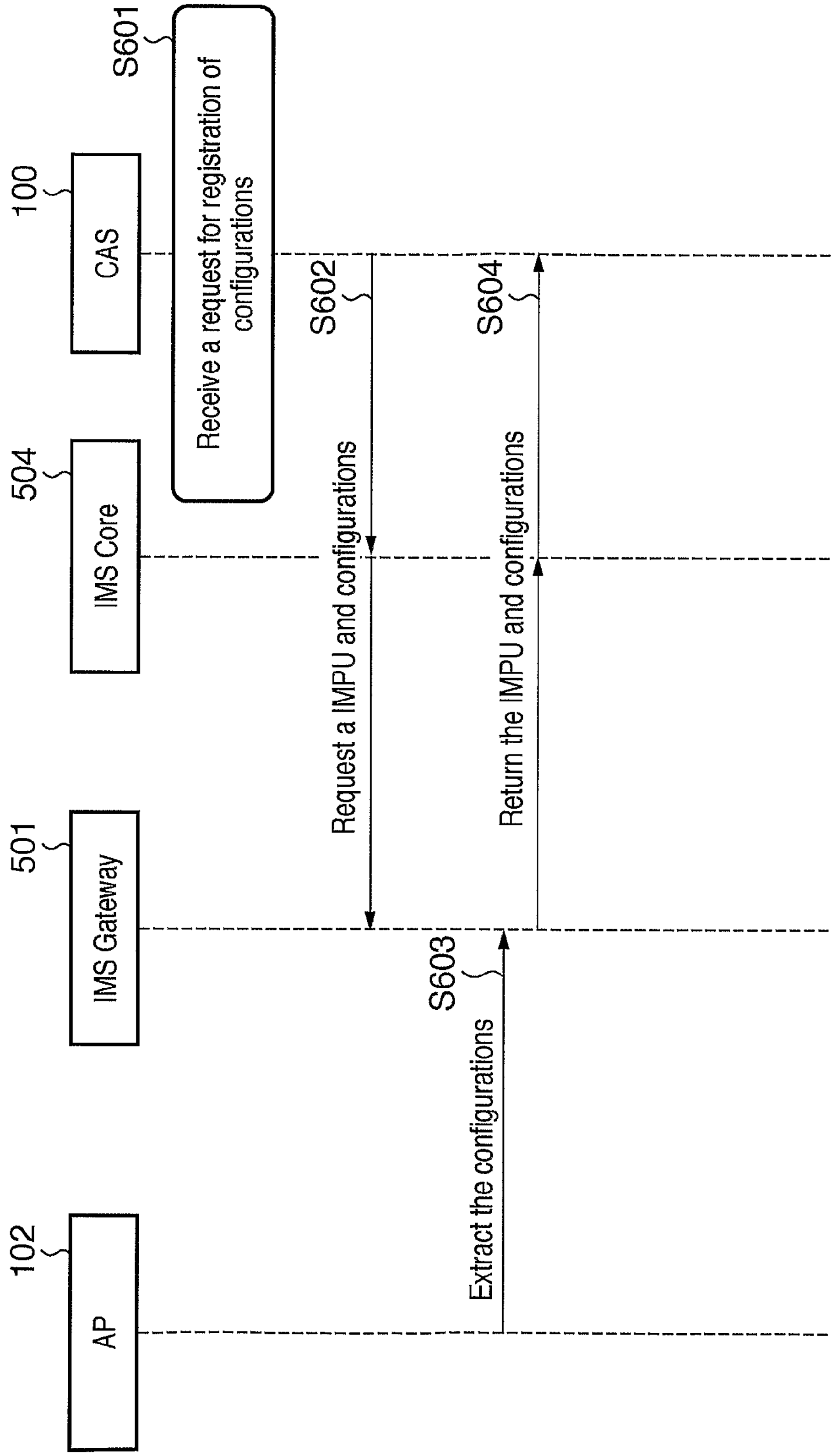
FIG. 6 illustrates exemplary detailed operations of step S401 according one embodiment.

FIG. 6 illustrates exemplary detailed operations of step S401 according one embodiment. In this case, the IMS gateway 501 uploads configurations of the local network 103 and a telephone number corresponding to this local network 103 to the CAS 100. The IMPU 502 may be used as the telephone number corresponding to the local network 103.

In step S601, the owner of the AP 102 requests registration of the configurations of the local network 103 to the CAS 100. The obtaining unit 202 receives this request. For example, in case that the local network 103 is a home network, the owner is a family user who owns a home AP device, and in case that the local network 103 is a public hotspot, the owner is a hotpot service provider.

In step S602, the obtaining unit 202 sends a request for the IMPU 502 and the configurations of the local network 103 to the IMS gateway 501 via the IMS core 504, and the IMS gateway 501 receives this request. In step S603, the IMS gateway 501 extracts the configurations of the local network 103 from the AP 102.

In step S604, the IMS gateway 501 encodes the configurations by e.g. XML and uploads the configurations to the CAS 100 via the IMS core 504 using but not limited to a SIP PUBLISH message. Whenever the IMS gateway 501 detects a change in configurations, the IMS gateway 501 may upload the change to the CAS 100. One example of the SIP PUBLISH message is the following:

```
PUBLISH sip:0312345678@imsop.net SIP/2.0
    Event: local_config
    Content-Type: application/local_config-
prameters+xml
    <configurations xmlns="urn:ericsson:local-
config">
        <parameter type="wlan">
            ssid=myhome&wepkey=1234567890abcde
        </parameter>
    </configurations>
```

The Request-URI of the PUBLISH message is the IMPU 502 of the IMS gateway 501 to which the uploaded configurations are associated. The event package "local_config" defines a specific SIP event application that is implemented using SIP event framework. This event package name is assumed to be standardized and registered as a rule of initial filter criteria (iFC) defined by TS23.218 in service profiles of the IMS gateway 501 stored in HSS, so that a PUBLISH message for this event package are routed to the CAS 100. The SIP message body of the PUBLISH message contains the configurations. In the above example, the configurations contain parameters for WLAN.

Figure 7:
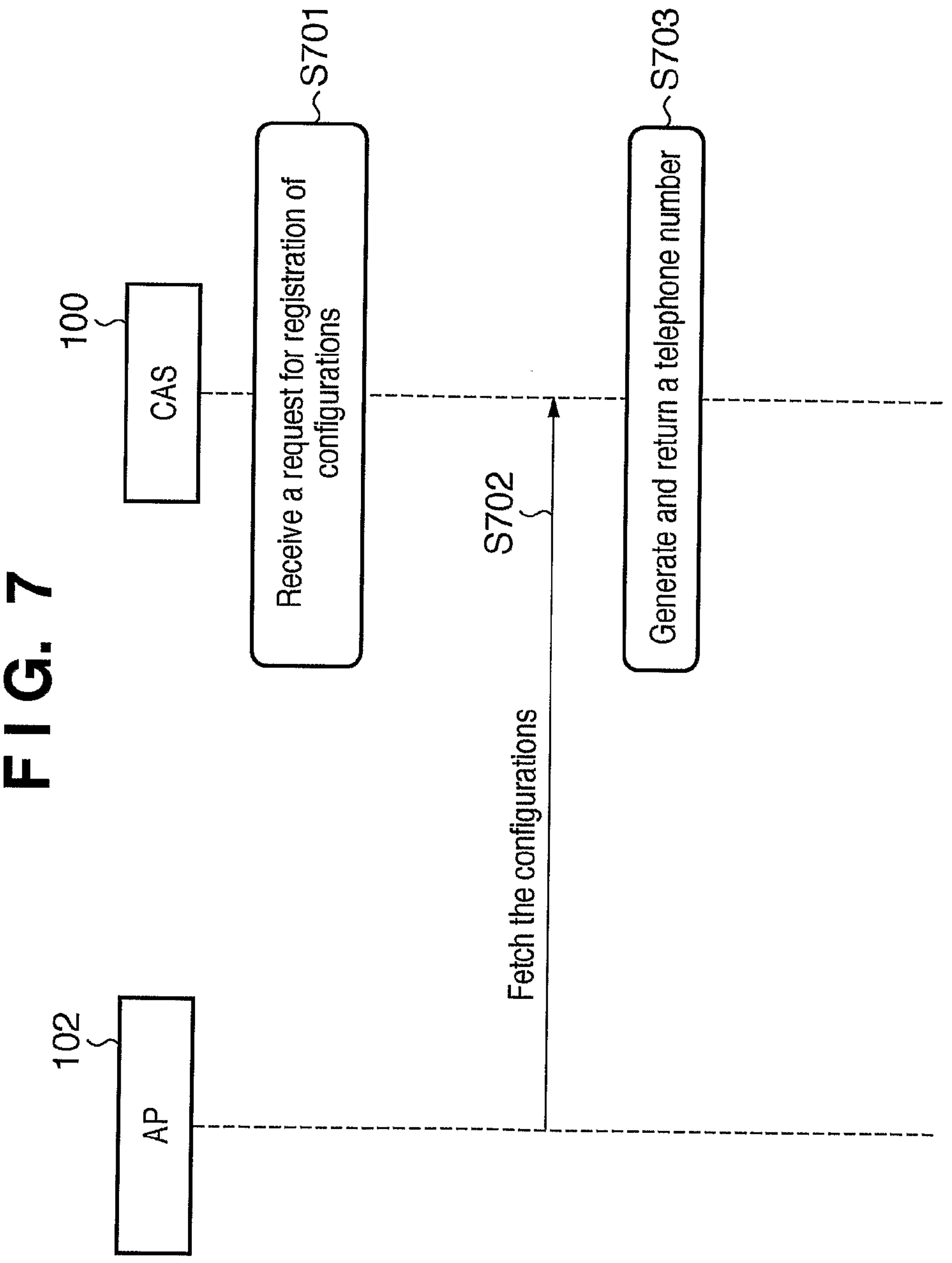
FIG. 7 illustrates exemplary detail operations of step S401 according another embodiment.

FIG. 7 illustrates exemplary detail operations of step S401 according another embodiment. In this case, the AP 102 uploads the configurations of the local network 103 using standard device management protocols. The assumption is that the AP 102 supports the device management standard called TR 069 defined by BBF (Broadband Forum). Based on the TR 098 object models and the CWMP (CPE WAN Management Protocol), an ACS (Automatic Configuration Server) function of the CAS 100 can query the AP 102 for its WiFi configuration parameters. These parameters are contained in the WiFi LAN profile definition for InternetGatewayDevice.

In step S701, the owner of the AP 102 uses a web browser to logon to a web-based administration console of the AP 102. Through the web administration console, the owner requests for registration of the configurations. The AP 102 then sends the request to the CAS 100 and the CAS 100 receives this request. The address (or web service URL) of the CAS 100 may be factory-configured in the AP 100. Some business transaction such as presenting a credit card number may follow if the operator of the CAS 100 charges the owner of the AP 102 for the automatic configuration service.

In step S702, the ACS function of the CAS 100 fetches WLAN configuration parameters through the CWMP from the AP 102. In step S703, the generating unit 207 generates a new telephone number corresponding to the local network 103. Finally, the CAS 100 returns the new telephone number to the owner of the AP 102, for example, by displaying the telephone number on the web administration console. The owner of the AP 102 may display this telephone number on signboards in case that the local network 103 is a public hotspot.

It should be understood that mechanisms in which the obtaining unit 202 obtains the configurations and the telephone number is not limited to the above examples. For example, even if the local network 103 includes the IMS gateway 501, the generating unit 207 may generate a new telephone number corresponding to the local network 103 and the obtaining unit 202 may obtain this new telephone number instead of obtaining the IMPU 502. The obtaining unit 202 may not obtain the configurations from the AP 102. The owner of the AP 102 may manually input the configurations to the CAS 100 and the obtaining unit 202 may obtain these configurations. The owner of the AP 102 may obtain a new telephone number and input this telephone number to the CAS 100.

Figure 8:
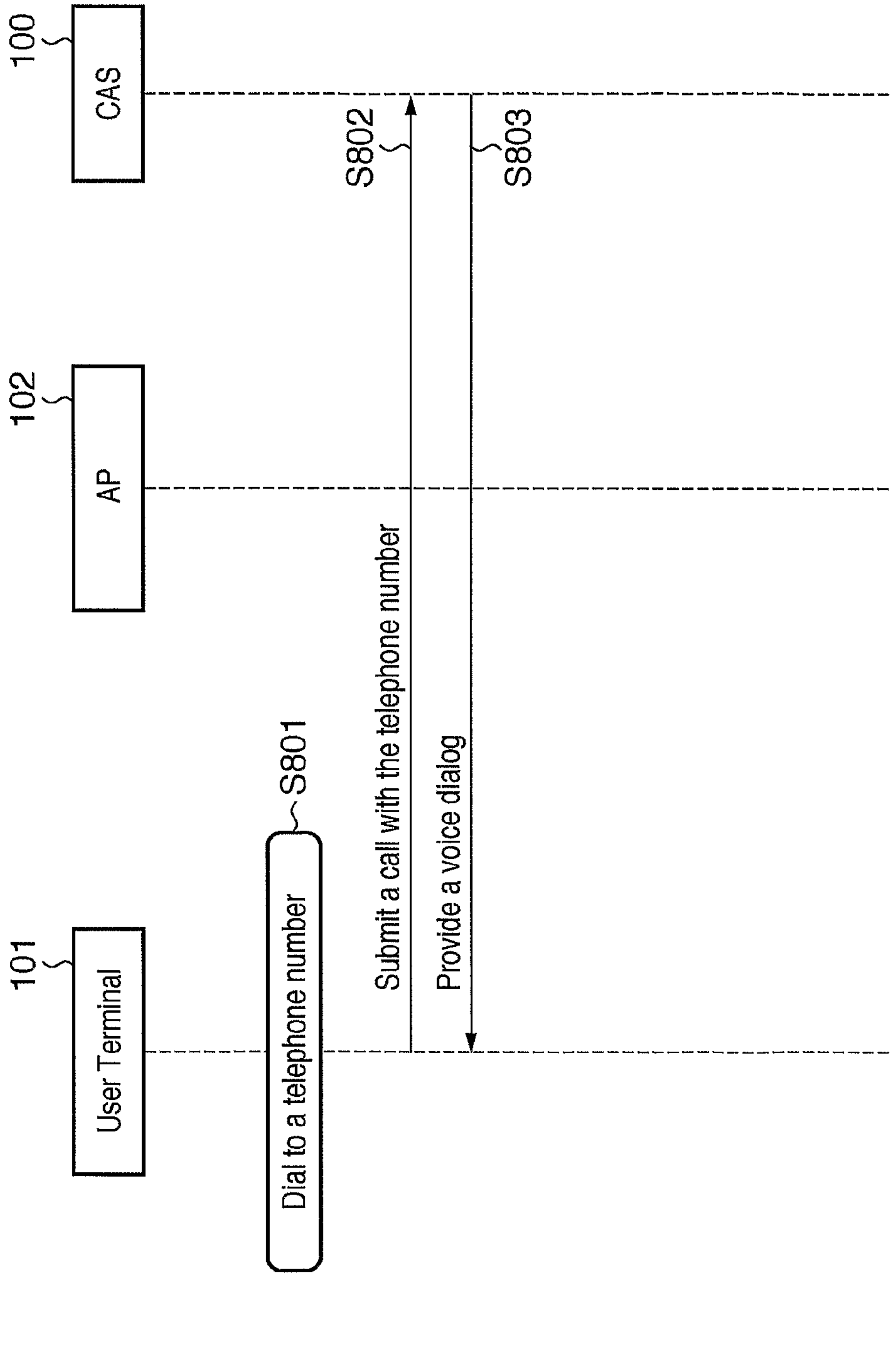
FIG. 8 illustrates exemplary detailed operations of step S403 according to one embodiment.

FIG. 8 illustrates exemplary detailed operations of step S403 according to one embodiment. The CPU included in each device executes computer programs stored in memory of each device to process these operations. In this embodiment, the user of the user terminal 101 dials the telephone number corresponding to the local network 103 in order to obtain the configurations of this local network 103.

In step S801, when the user wants the user terminal 101 to be connected to the local network 103, the user dials the telephone number corresponding to the local network 103 and the user interface 307 received the dialed telephone number. The telephone number is, for example, the IMPU 502 of the IMS gateway 501 or a telephone number displayed with an advertisement on signboards near the hotspot area. When the local network 103 is a hotel room network, the user may call to the telephone number of the hotel room in order to obtain configurations of the hotel room network.

Figure 9:
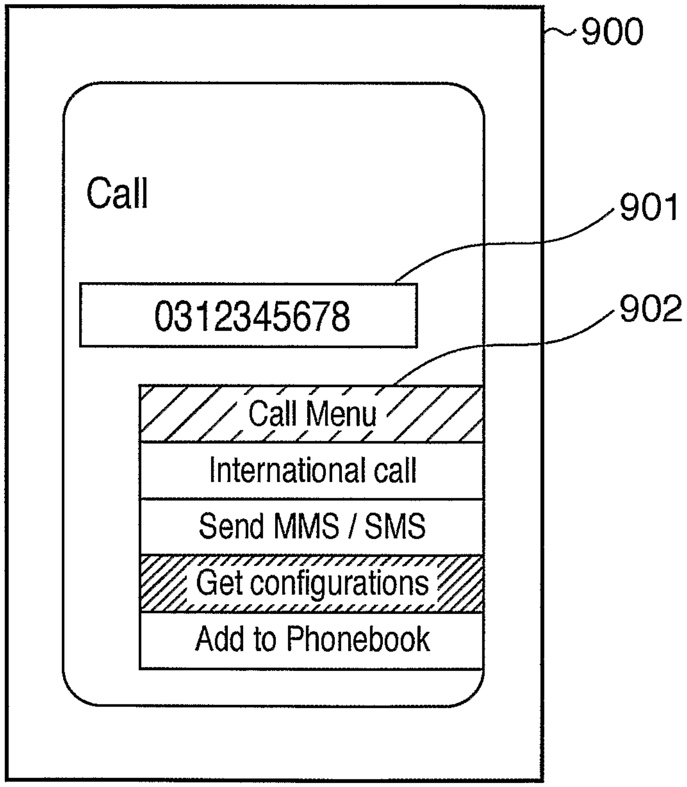
FIG. 9 illustrates an exemplary screen 900 of the user terminal 101 to receive the user's selection.

When the telephone number corresponding to the local network 103 is also used for a "normal" call such as a conversation call, the receiving unit 204 distinguishes a type of the call from the user terminal 101. For this end, the user of the user terminal 101 may select an option indicating a request for the configurations. FIG. 9 illustrates an exemplary screen 900 of the user terminal 101 to receive the user's selection. The user interface 307 displays the screen 900 including an input field 901 and a call menu 902. The user inputs a telephone number into the input field 902, for example, using a keypad or a touch screen and the user interface 307 receives this telephone number. If the user wishes the user terminal 101 to be connected to the local network 103, the user selects a call option “Get configurations” from the call menu 902 and the user interface 307 receives this selection. If the user wishes to call to another telephone for conversation, the user does not select any call options, that is, the user selects a default setting.

When the user selects the call option “Get configurations” in step S801, the call unit 302 submits a call including a telephone number corresponding to the local network 103 in step S802. In this case, the call to the telephone number corresponding to the local network 103 acts as a request for the configurations, and the telephone number included in the request is the destination telephone number of the call. For example, the call is submitted as the following SIP SUBSCRIBE message.

```
SUBSCRIBE sip:0312345678@imsop.net SIP/2.0
Event: local_config
X-Local-Config: wlan
```

This event package of the SUBSCRIBE message is set to “local_config” in order to specify that this SUBSCRIBE message is intended for requesting local configurations associated with a request URI or telephone number. This event package name is assumed to be registered as a rule of iFC so that SUBSCRIBE requests for this event package are routed to the CAS 100.

The SUBSCRIBE message may contain a SIP header, X-Local-Config so that the user terminal 101 can inform the CAS 100 of what type of configurations the user terminal 101 is requesting according to device capabilities supported by the user terminal 101. In this example, the user terminal 101 solely supports WLAN and hence WLAN configurations are requested. In this case, the user terminal 101 has a functionality to handle this call option.

According to another embodiment, instead of selecting a call option from the call menu 902, the user may select a type of call by responding to a voice dialog from the CAS 100 in step S803. The voice dialog is established between the user terminal 101 and the CAS 100. For example, the CAS 100 plays a recorded voice such as “press #1 for a normal call, press #2 for configurations.” The user who wishes to connect the local network 103 will press #2 and the user interface 307 will receive this selection and forward it to the CAS 100. During the voice dialog, for security enhancement, the user may be requested by an interactive voice response function in the CAS 100 to enter a pre-established PIN code. In this case, the user terminal 101 need not have a functionality to handle this call option. In other words, any conventional user terminal can obtain the configurations just by dialing the telephone number corresponding to the local network 103.

When the user terminal 101 supports a SIP protocol, the steps S405 and S407 may be executed as follows. In step S405, once the receiving unit 204 receives the SUBSCRIBE message, the AA unit 209 may authorize a calling user identified by a P-Asserted-Identity when an access control list (ACL) exists. The ACL is configured per telephone number to which configurations of the local network 103 are associated. The ACL lists users in the form of IMPU who are allowed to get local configurations. For instance, for home configurations, only family members’ IMPUs may be listed in the ACL. For example, this ACL is configured by the owner of the AP 102 in the standard way such as using XCAP over Ut interface and maintained in XDMS of the CAS 100. In the public hotspot case, the ACL may not exist if a hotspot service provider allows any users to access to hotspots without any prior user registration. Even in this case, the hotpot service provider can authenticate users, and charge the users through the IMS operator because the users are identified through the phone calls.

In step S407, once the user is authorized, the response unit 206 returns the configurations associated with the called telephone number using a NOTIFY message. The message body of the NOTIFY message conveys the configurations, as shown below:

```
NOTIFY sip:09087654321@imsop.net SIP/2.0
Event: local_config
Content-Type: application/local_config-
prameters+xml
<configurations xmlns=“urn:ericsson:local-config”>
    <parameter type=“wlan”>
        ssid=myhome&wepkey=1234567890abcde
    </parameter>
</configurations>
```

Figure 10:
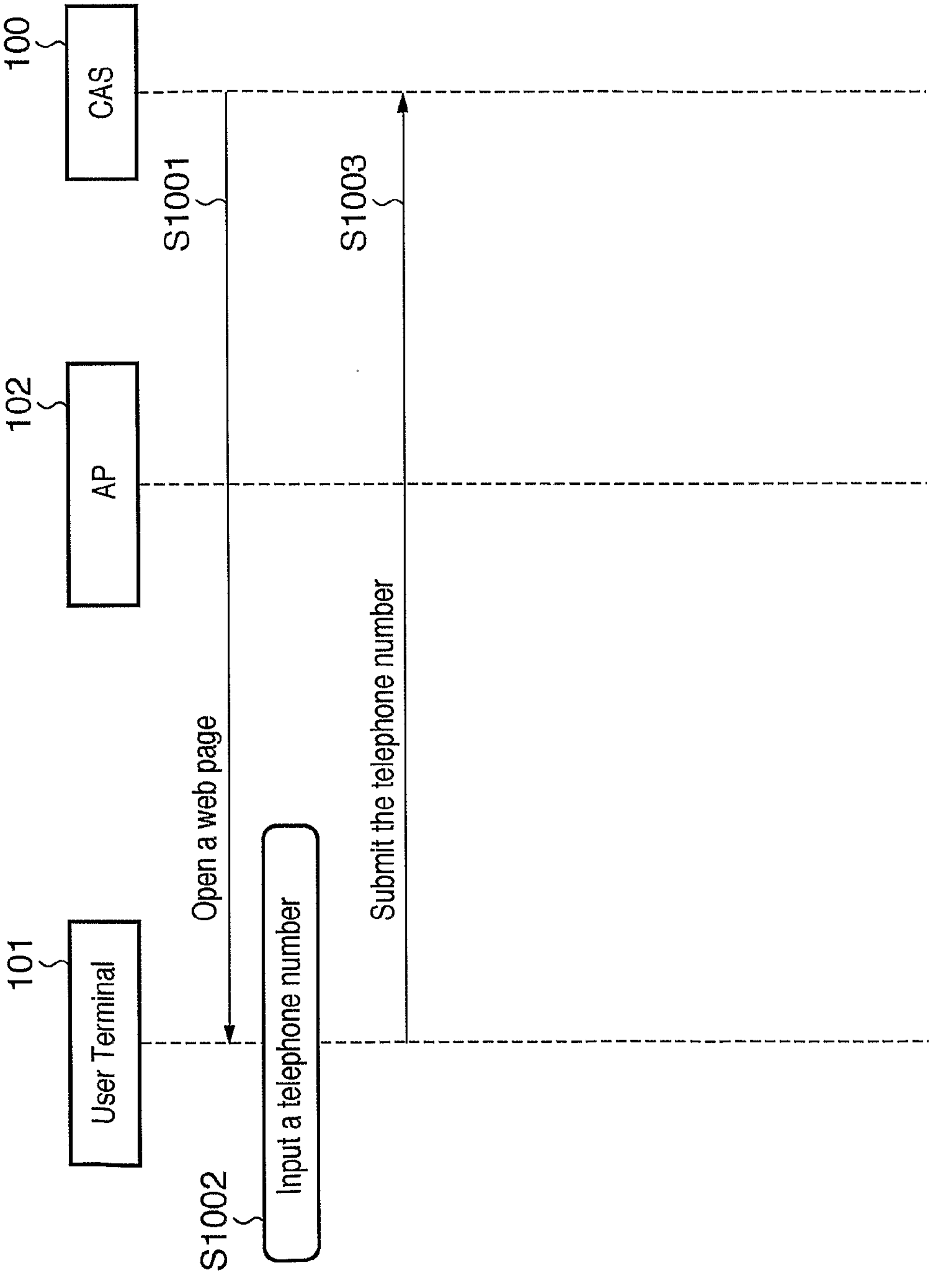
FIG. 10 illustrates exemplary detailed operations of step S403 according to another embodiment.

FIG. 10 illustrates exemplary detailed operations of step S403 according to another embodiment. The CPU included in each device executes computer programs stored in memory of each device to process these operations. In this embodiment, the user of the user terminal 101 sends the telephone number corresponding to the local network 103 via a web page to the CAS 100 in order to obtain the configurations of this local network 103. This embodiment may have an advantage in the user terminal 101 that does not support IMS client but OMA DM (Device Management) client.

Figure 11:
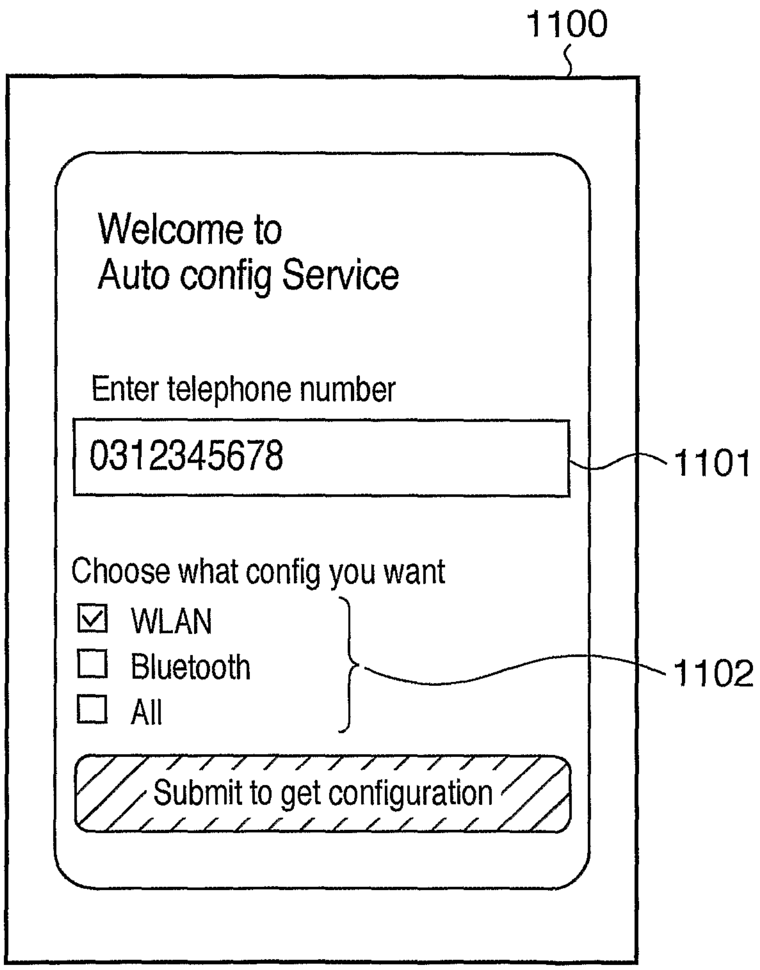
FIG. 11 illustrates an exemplary web page 1100 provided by the receiving unit 204.

In step S1001, the user accesses a web page using the browser unit 304. The web page is provided by the receiving unit 204. FIG. 11 illustrates an exemplary web page 1100 provided by the receiving unit 204. The web page 1100 includes an input field 1101 and check boxes 1102. The check boxes 1102 list potential types of configurations such as WLAN or Bluetooth, from which the user can select what the user wants (WLAN is chosen in the example). In step S1002, the user inputs a telephone number corresponding to the local network 103 into the input field 1101 and selects a type of the local network 103. The user interface 307 receives the input telephone number and the type of the local network 103. For example, in a hotspot case, the telephone number corresponding to the hotspot WLAN is advertised in signboards near the hotspot area, desktop displays, etc. In step S1003, the browser unit 304 submits the telephone number and the type of the local network 103 to the receiving unit 204, and the receiving unit 204 receives the telephone number and the type.

The AA unit 204 may authenticate the user in the step S405 if configurations should be sent to authorized users only. In this case, the user may be explicitly authenticated via username/password or implicitly authenticated via a telephone number of the user terminal 101 if the receiving unit 204 can automatically obtain the telephone number of the user terminal 101. These authorized user information may be preconfigured by the owner of the AP 102.

Submitting the telephone number by the web page initializes the OMA DM protocols between the user terminal 101 and the an OMA DM Server in the CAS 100. The parameters sent to the user terminal 101 in step S407 may be in XML format. For example, the list of parameters for WiFi configuration contains the following parameters:

```
<characteristic type=“APDEF”>
    <parm name=“APID” value=“Gg_AP”/>
    <parm name=“BEARER” value=“WLAN”/>
    <parm name=“NAME” value=“Gg Wifi”/>
    <parm name=“INTERNET”/>
    <characteristic type=“WLAN”>
    <parm name=“SSID” value=“mySSID”/>
    <parm name=“UsedSSID” value=“mySSID”/>
```

-continued

```
<parm name="NetworkMode"
value="Infrastructure"/>
<parm name="SecurityMode" value="WPA"/>
<parm name="UseWPAPSK" value="True" />
<parm name="WPAPreSharedKey" value="myKey" />
</characteristic>
```

According to yet another embodiment, the SMS unit 303 simply sends an SMS mail to the telephone number corresponding to the local network 103 as the request for the configurations of the local network. In this case, the telephone number included in the request is the destination telephone number of the SMS mail.

In some embodiments, the AP 102 may define access classes. The AP 102 maintains a policy data which governs treatment of user packets for the respective access classes configured in the AP 102 and the identifications of the respective access classes. An example is having two access classes: priority class and BE (Best Effort)-only class, where the priority class means that the user packets from the user terminal 101 can be treated as higher priority packets than BE-only class, and the BE-only class that the user packets from the user terminal 101 are treated only as a BE class packet. Another example is that the high-prioritized service class has a WiFi channel that is assigned and dedicated to an only single user while a WiFi channel in the low prioritized service class is assigned to and shared by multiple users.

In step S401 in FIG. 4, the AP 102 may upload the configuration including those about the service classes in terms of packet treatment to the CAS 100. The AP owner may send the information to configure the access classes in terms of other features such as charging (e.g., free of charge class, low-charge class and normal-charge class). The AP owner may also upload the information to configure the ACL for particular access classes, which is used to authenticate and authorize the user of the user terminal 101 to access the AP 102 with a designated service class. The CAS 100 may create ID's and necessary data sets corresponding to the access classes according to the uploaded access class information. For example, different telephone numbers, access code numbers or the likes may be created as the IDs to identify the respective classes.

In step S403, calling to or submitting the telephone number corresponding to the selected access class, or submitting an code number to identify the service class in case that the telephone number does not identify the access class indicates to the CAS 100 the specific service class that the user of the user terminal 101 wants to access. For example, the MAC address of the user terminal 101 is sent to the CAS 100, which is used to identify the user packets to be treated according to the chosen access class for packet treatment. The CAS 100 sends the configuration parameters (service class id, MAC address) to the AP 102 in step S408 after the user is authorized to access the designated access class. The AP 102 installs the parameters and returns the acknowledgement.

According to one embodiment, the user terminal 101 further has a GPS unit and sends the position information of the user terminal 101 to the CAS 100 when the user terminal 101 sends the request for the configurations in step S403. The storage unit 203 further stores a service area of the local network 103 associated with the configurations and the retrieving unit 205 retrieves the configurations whose service area covers the position of the user terminal 101. This is an advantage from the user experience point of view, as the user only has to dial the telephone number to configure the hotspot wherever they are.

According to embodiments of the invention, the user of the user terminal 102 can obtain the configurations of the local network using a familiar user action, the telephone call. People usually don't know how to make e.g. a WLAN configuration, but people know how to make a phone call. Users only make a phone call to a certain telephone number to setup necessary local configurations, and the local configuration information is carried back to the requesting phone via IMS or device management protocols, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A system for providing a user terminal with configurations of a local network, the system comprising:

an obtaining unit configured to obtain the configurations of the local network and a telephone number corresponding to the local network;

a storage unit configured to store the obtained configurations and the obtained telephone number such that the obtained configurations and the obtained telephone number are associated with each other;

a receiving unit configured to receive, as a request for the configurations from the user terminal, a call or an SMS mail from the user terminal to the telephone number corresponding to the local network;

a retrieving unit configured to retrieve the configurations associated with the received telephone number from the storage unit; and a response unit configured to respond by sending the retrieved configurations to the user terminal.

2. The system of claim 1, wherein the telephone number corresponding to the local network is a telephone number assigned for an access point of the local network.

3. The system of claim 2, wherein the obtaining unit is configured to obtain the telephone number corresponding to the local network from the access point of the local network.

4. The system of claim 3, wherein an IMS gateway acts as the access point of the local network, the telephone number corresponding to the local network is an IMPU assigned for the IMS gateway, and the obtaining unit is configured to obtain the IMPU using a SIP protocol.

5. The system of claim 1, further comprising a generating unit configured to generate a telephone number corresponding to the local network, wherein the obtaining unit is configured to obtain the telephone number corresponding to the local network from the generating unit.

6. The system of claim 1, wherein if a plurality of local networks are assigned the same telephone number, the request for the configurations further comprises an indication for indicating at least one of the plurality of local networks, and the retrieving unit is configured to retrieve the configurations of the at least one of local networks indicated by the indication.

7. A user terminal comprising:

a mobile network interface configured to communicate with a mobile network;

a local network interface configured to communicate with a local network; and a user interface configured to receive, from a user of the user terminal, a telephone number corresponding to the local network;

wherein the mobile network interface is further configured to originate a call or an SMS mail to the received telephone number as a request to the mobile network, and configured to receive the configurations of the local network from the mobile network, and the local network interface is further configured to use the received configurations to communicate with the local network.

8. A method for providing a user terminal with configurations of a local network, comprising:

obtaining the configurations of the local network and a telephone number corresponding to the local network;

storing the obtained configurations and the obtained telephone number in to a storage unit such that the obtained configurations and the obtained telephone number are associated with each other;

receiving, as a request for the configurations from the user terminal, a call or an SMS mail from the user terminal to the telephone number corresponding to the local network;

retrieving the configurations associated with the received telephone number from the storage unit; and responding by sending the retrieved configurations to the user terminal.

9. A non-transitory computer-readable medium storing a computer program that, when executed by a computer, causes the computer to execute a method for providing a user terminal with configurations of a local network, the computer program comprising program instructions for:

obtaining the configurations of the local network and a telephone number corresponding to the local network;

storing the obtained configurations and the obtained telephone number in to a storage unit such that the obtained configurations and the obtained telephone number are associated with each other;

receiving, as a request for the configurations from the user terminal, a call or an SMS mail from the user terminal to the telephone number corresponding to the local network;

retrieving the configurations associated with the received telephone number from the storage unit; and responding by sending the retrieved configurations to the user terminal.

* * * * *